United States Patent [19]

Su

[11] Patent Number: 4,892,772
[45] Date of Patent: Jan. 9, 1990

[54] FIBER REINFORCED RESIN SHEETS

[75] Inventor: Kwai-Yung B. Su, Hockessin, Del.

[73] Assignee: E. I. DuPont de Nemours and Company, Wilmington, Del.

[21] Appl. No.: 271,152

[22] Filed: Nov. 14, 1988

[51] Int. Cl.[4] ............................................. B51B 5/12
[52] U.S. Cl. ................................... 428/113; 428/212; 428/284; 428/285; 428/292; 428/294; 428/299; 428/298; 428/369; 428/408; 428/105; 428/902
[58] Field of Search ............... 428/297, 298, 292, 294, 428/295, 105, 285, 408, 284, 113, 212, 369, 902

[56] References Cited

U.S. PATENT DOCUMENTS

| 197,502 | 11/1877 | Turner et al. | 428/294 |
| 3,252,833 | 5/1966 | Skobel | 428/294 |
| 3,253,073 | 5/1966 | Skobel | 264/174 |
| 3,789,899 | 2/1974 | Kobayashi | 152/356 |
| 4,715,924 | 12/1987 | McConnell | 156/433 |

FOREIGN PATENT DOCUMENTS 2108204 2/1971 Fed. Rep. of Germany .
7610592 3/1978 Netherlands .

OTHER PUBLICATIONS

Potter, IPC Business Press Limited, "The Influence of Accurate Stretch Data for Reinforcements on the Production of Complex Structural Mouldings" (1979).

Primary Examiner—James J. Bell

[57] ABSTRACT

A composite sheet of a matrix resin reinforced with a unidirectional array of fiber lengths wherein each of the fiber lengths has alternating straight and excess lengths such that when the sheet is formed into an article, the fibers straighten out and provide essentially straight continuous fiber properties.

12 Claims, 2 Drawing Sheets

FIBER REINFORCED RESIN SHEETS

BACKGROUND OF THE INVENTION

This invention relates to fiber reinforced resin sheets for use in molding composite articles, more particularly it relates to continuous filament fiber reinforced resin sheets.

Composite sheets of continuous filament reinforced resin have been made. One technique is to prepare a warp of filaments as by winding on a frame, impregnating them with resins and hot pressing to form a thin flat sheet which is cut from the frame. Several such sheets are then cross lapped and again hot pressed to form the final reinforced composite product. Such products have high strength and stiffness.

Problems occur when attempts are made to produce deep drawn three dimensional articles by hot pressing continuous carbon, p-aramid or glass filament containing resin sheets. The articles in many instances exhibit uneven areas and wrinkles. The use of staple fibers as reinforcement substantially overcomes the above-stated problems but at a great sacrifice to strength and stiffness.

SUMMARY OF THE INVENTION

The above-noted deficiencies are overcome by forming each layer or sheet of the layered composite structure of a resin matrix reinforced with a unidirectional array of fiber lengths wherein each fiber length has alternating straight and excess length sections so that when the sheet is formed into an article the fibers straighten out and provide essentially straight continuous fiber properties. The fibers may be either continuous filament or lengths of stretch broken fibers. The matrix may be thermoplastic or thermosetting resin.

Glass, carbon and aramid are examples of suitable filaments for use in this invention.

DETAILED DESCRIPTION OF THE ILLUSTRATED EMBODIMENT

Figure 1:
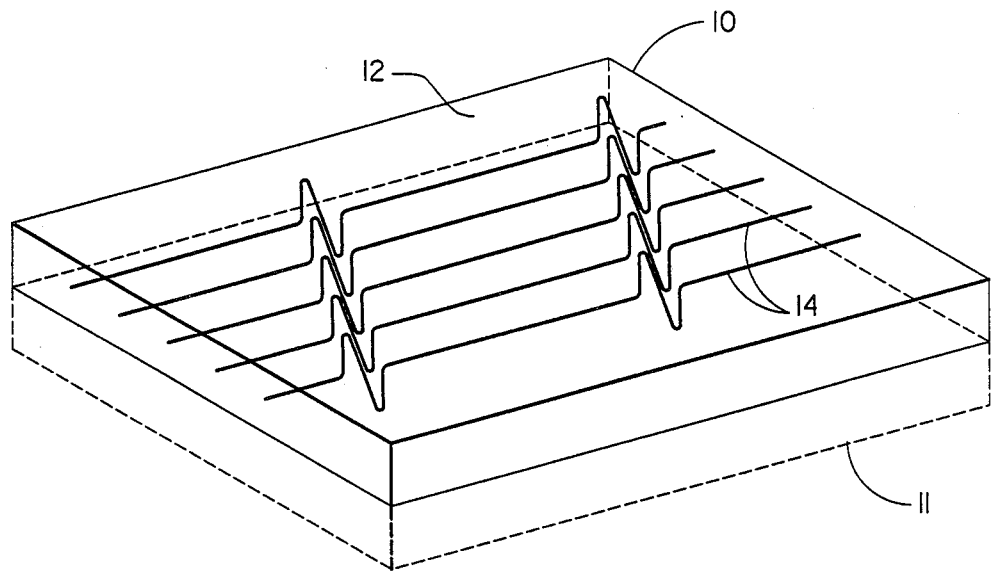
FIG. 1 is a schematic perspective illustration of one embodiment of a sheet product of the invention.
Figure 2:
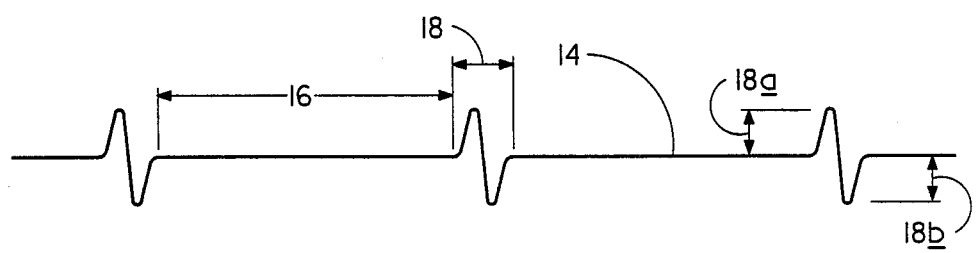
FIG. 2 is a schematic illustration of one of the yarns in FIG. 1.

Referring now to FIG. 1 it can be seen that the sheet structure 10 of this invention comprises a resin matrix material 12 reinforced with a unidirectional array of fiber lengths 14. Sheet 10 may be stacked with other sheets such as sheet 11. As best seen in FIG. 2, each fiber length 14 has at least one straight length 16 and at least one excess length 18. The straight and excess lengths alternate along the fiber length. The excess length 18 shown in FIG. 2 is in a sinusoidal configuration with peaks 18a and 18b extending relatively above and below straight length 16. The extended length of one straight length plus one excess length portion may be in the range of from 105 to about 150 percent of the unextended length of one straight length 16 plus one excess length 18.

Figure 3:
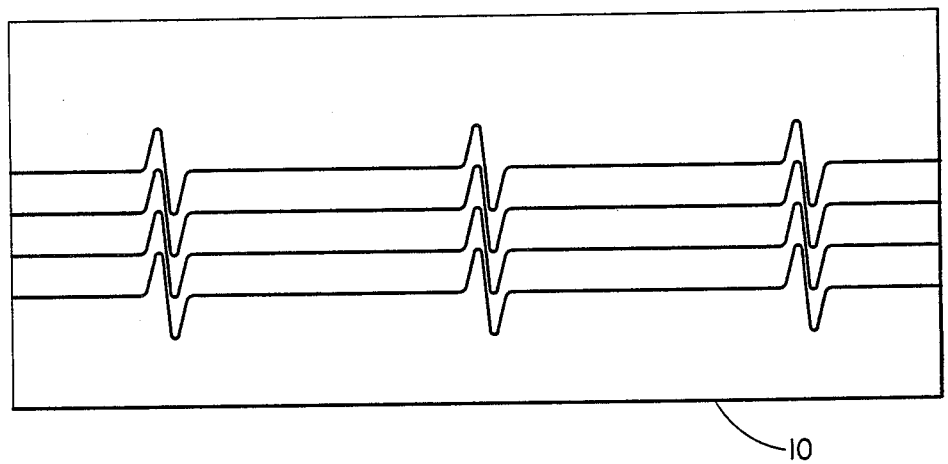
FIG. 3 is a schematic representation of a single layer containing a parallel array of yarns.
Figure 4:
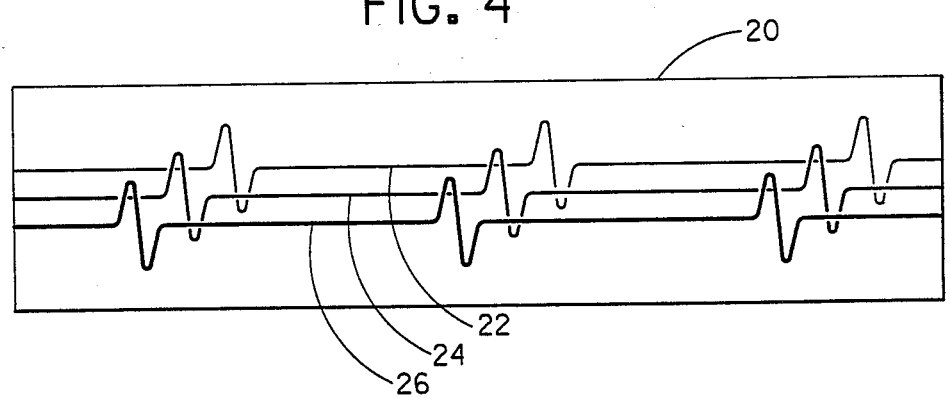
FIG. 4 is a schematic representation of a plurality of layers wherein the arrays of yarns are displaced both transversely and axially with respect to each other.

FIG. 3 is a plan view of a single sheet layer reinforced with a parallel array of fibers 14 as shown in FIG. 1. The individual sheets may then be stacked unidirectional to form a layered structure 20 as represented in FIG. 4 wherein three layers are each represented by a single fiber length 22, 24, and 26. Each layer and its reinforcing fiber is shown displaced from an adjacent layer both in the axial direction and the transverse direction of the layered structure. The sheets may also be oriented in a quasi-isotropic lay-up by not only displacing them axially and transversely as described in connection with FIG. 4, but also stacking sheets where the longitudinal direction of the fibers is angularly oriented with respect to the longitudinal axis of the layered structure.

Composite articles of quasi isotropic lay-ups of stacked groups of sheets that have individual sheets displaced axially and transversely (as in FIG. 4) are contemplated when the groups are stacked with the longitudinal axis of the fibers in each group oriented in the following manner:

$$(-45°/90°/+45°/0°/0°/+45°/90°/-45°)$$

and the stacked group is molded together under heat and pressure.

The fiber array used in this invention may be produced using an apparatus of the type disclosed in U.S. Pat. No. 4,715,924 which discloses an end use of nonwoven webs of fibers for reinforcing composite structures (column 3, lines 11–15).

In a series of tests it was found that maximum properties of the formed composite article are not realized until all excess length in the fibers is straightened out. Hence, for maximum properties in such a composite article, the fiber excess length distribution in a sheet preferably is tailored to the expected strain distribution of the article.

While maximum properties are achieved when all excess length in the fibers is straightened out, it should be understood that even when the excess fibers length sections have not been fully extended, a high degree of strength and modulus for the molded shaped article can still be achieved.

What is claimed is:

1. A composite structure for forming into a shaped article comprising a sheet of matrix resin reinforced with a unidirectional array of fiber lengths, each of said fiber lengths having alternating straight length and excess length sections.

2. The composite of claim 1 wherein the fiber lengths are formed of continuous filaments.

3. The composite of claim 1 wherein said fiber lengths are formed from a sliver of stretch broken filaments.

4. The composite of claim 1, 2 or 3 wherein said excess length sections are sinusoidal in form.

5. The composite of claim 1, 2 or 3 wherein said excess length sections are zig-zag in form.

6. The composite of claim 1 wherein said fiber is glass.

7. The layered composite of claim 1 wherein said fiber is a p-aramid fiber.

8. The composite of claim 1 wherein said fiber is carbon.

9. The composite of claim 1 wherein said resin is thermoplastic.

10. The composite of claim 1 wherein a plurality of said sheets are stacked one on the other to form a layered structure.

11. The composite of claim 10 wherein adjacent sheets in a group of sheets are displaced from each other transversely and axially with respect to the longitudinal axis of the layered structure.

12. The composite of claim 11 wherein a plurality of said groups are in a quasi isotropic relationship with respect to the longitudinal axis of the fibers in each group to form said layered structure.

* * * * *